No. 802,282. PATENTED OCT. 17, 1905.
F. A. GERLING.
SPEED CONTROLLING AND REVERSING MECHANISM.
APPLICATION FILED JUNE 7, 1904.
2 SHEETS—SHEET 1.
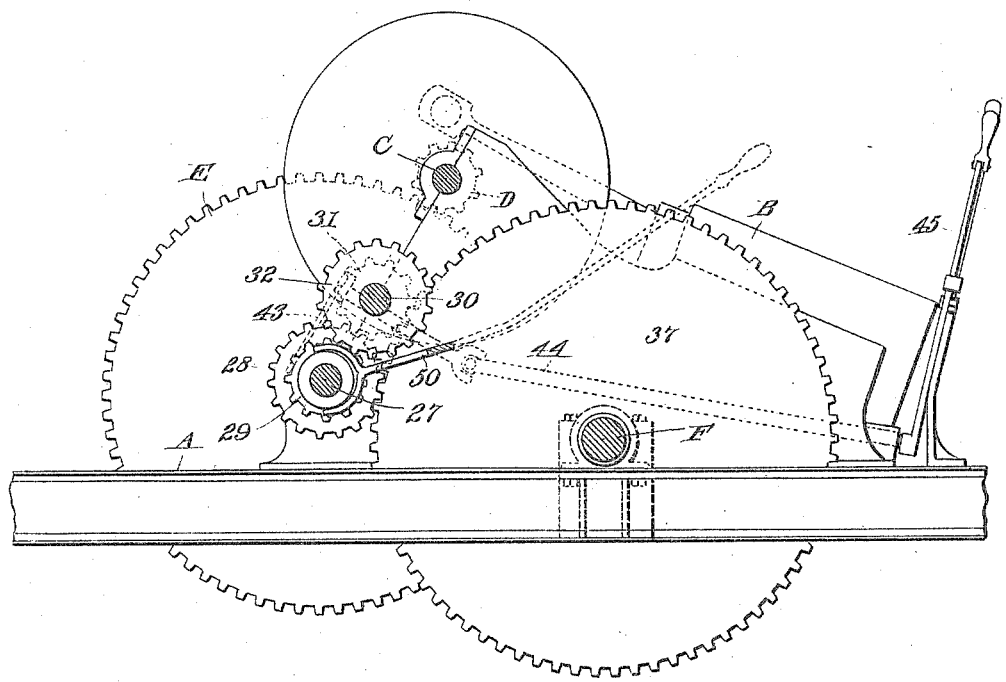
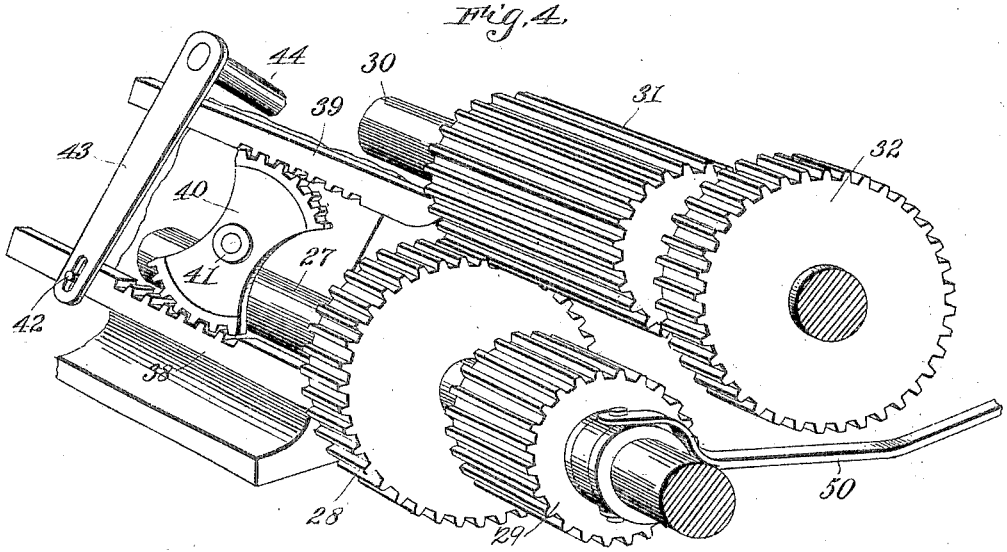
Witnesses
Fred A. Gerling, Inventor.
by Attorneys No. 802,282. PATENTED OCT. 17, 1905.
F. A. GERLING.
SPEED CONTROLLING AND REVERSING MECHANISM.
APPLICATION FILED JUNE 7, 1904.

2 SHEETS—SHEET 2.

Witnesses
Fred A. Gerling, Inventor.
by C. A. Snow & Co.
Attorneys

UNITED STATES PATENT OFFICE.

FRED AUGUST GERLING, OF PORTLAND, OREGON.

SPEED-CONTROLLING AND REVERSING MECHANISM.

No. 802,282.   Specification of Letters Patent.   Patented Oct. 17, 1905.

Application filed June 7, 1904. Serial No. 211,519.

*To all whom it may concern:*

Be it known that I, FRED AUGUST GERLING, a citizen of the United States, residing at Portland, in the county of Multnomah and State of Oregon, have invented a new and useful Speed-Controlling and Reversing Mechanism, of which the following is a specification.

This invention relates to improvements in mechanism for controlling the movements of traction-engines and other self-propelling vehicles and is also adapted for use in connection with reversing and speed-controlling mechanisms of various types—such, for instance, as those employed in marine propulsion.

One object of the invention is to provide a novel form of speed-controlling and reversing mechanism in which a plurality of shiftable gears are connected for mutual movement, thereby facilitating the various movements in changing speed or in reversing the direction of rotation of the driven shaft.

With these and other objects in view, as will more fully hereinafter appear, the invention consists in the novel construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the same.

Figure 2:
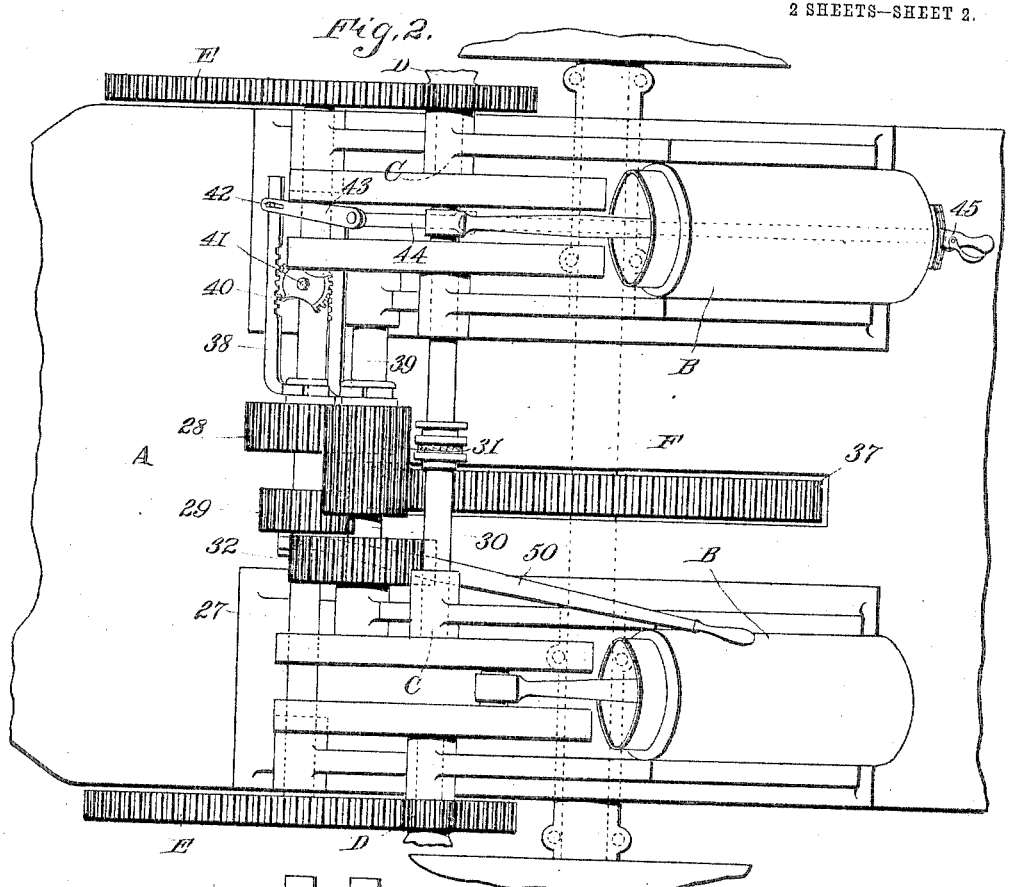
Figure 3:
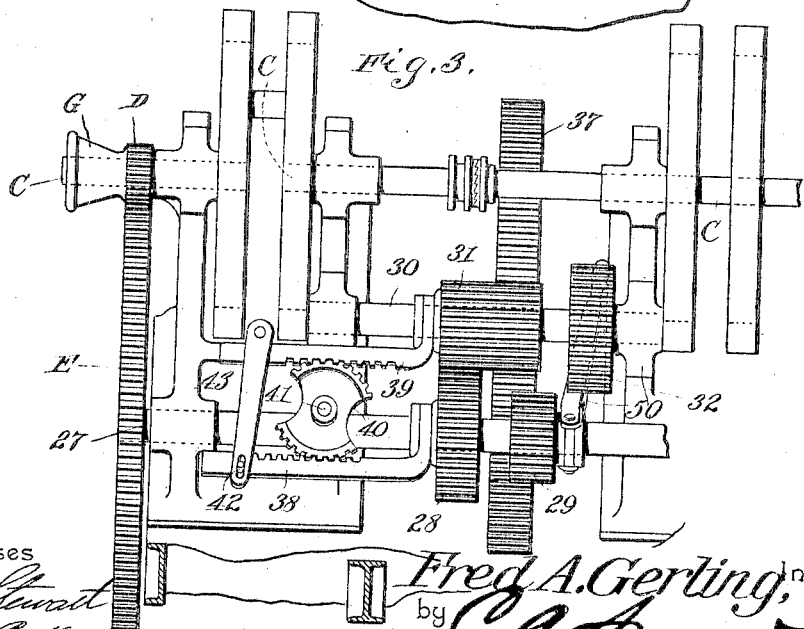

In the accompanying drawings, Figure 1 is a side elevation of a speed-controlling and reversing mechanism, illustrating the same as applied to the platform of a frame of a traction-engine. Fig. 2 is a plan view of the same. Fig. 3 is a front elevation of the principal parts of the apparatus. Fig. 4 is a detail perspective view of the reversing and speed-controlling gears detached.

Similar letters and numerals of reference are employed to indicate corresponding parts throughout the several figures of the drawings.

While the mechanism forming the subject of the present invention is adapted for use in connection with various reversing and speed-controlling mechanisms, it is found of especial value for use in connection with traction-engines and other self-propelling vehicles where it is necessary at times to quickly reverse the direction of movement or to change the speed.

The traction-engine employed in the present instance to illustrate the application of the invention is propelled by an internal-combustion engine or engines, and it includes a platform A, having suitable bearings for a number of shafts and carrying two internal-combustion engines B, the pistons of which are connected to a pair of crank-shafts C, having their horizontal axes in alinement. The two shafts may be coupled together by clutching mechanism of any desired character, and at their outer ends are pinions D, intermeshing with gears E of a second shaft 27, that is held in suitable bearings in the frame. The shaft 27 is geared in the manner hereinafter described to the main axle or shaft F of the vehicle, and the train of gearing extends from the crank-shafts of the engines to this main axle or shaft and serves to transmit to the latter the necessary rotative movement.

On the shaft 27 are feathered a gear 28 and a pinion 29, both of which will move longitudinally of the shaft, but are held from independent rotative movement. The frame is provided with bearings for a shaft 30, that extends parallel with the shaft 27 and carries a pinion 31 and a gear-wheel 32, the latter being rigidly secured to the shaft, but the pinion being feathered to permit longitudinal movement independent of said shaft. The main shaft or axle is provided with a gear 37, which under normal conditions intermeshes with the pinion 31, the face of the latter being wide enough to permit its teeth to intermesh with both the gear 37 and the gear-wheel 28, and when the parts are in the position shown in Fig. 3 the rotative movement of the shaft 27 will be imparted to the gear 28 and pinion 31 to the gear 37, and the traction-engine or other vehicle will be driven at a normal rate of speed.

The positions of the gear 28 and pinion 31 are controlled by a pair of parallel racks 38 and 39, having their adjacent faces toothed, and with said racks engages a pinion or double segmental rack 40, that is mounted on a stud-shaft 41, supported by the frame. The ends of the racks are provided with bifurcated arms which extend into annular grooves formed in the hubs of gear 28 and pinion 31, and when one of the racks is moved in one direction to shift the gear 28, as to the right, the gearing connection between the racks will transmit also a movement to the pinion 31, but in this case to the left.

Projecting from the rack 38 is a pin 42, which extends through the slotted end of a rocker-arm 43, that is carried by one end of a shaft 44, and said shaft is provided at its rear end with an operating-handle 45, and said lever carries the usual latch-bar, by which it may be locked in adjusted position. The hub of the pinion 29 is also provided with an annular groove to receive pins or fingers projecting from the end of a pivoted shifting-lever 50, that is carried by the frame and disposed within convenient reach of the operator.

Under normal conditions with the parts as illustrated in Fig. 3 the vehicle will be propelled forward at a normal speed. Should it be desired to reverse the direction of travel of the vehicle, the connection between the engine and the train of gearing is cut off, as by clutches G, and the engines may still be kept at work. The adjusting-lever 45 is then moved to the left, causing the movement of the rocker-arm 23 to the right. This moves the rack-bar 38, and the gear 28 is moved into mesh with the gear 37, while pinion 31 is moved in the opposite direction by means of the rack 39 and wholly disengages from the gear 37, so that shaft 27 will be connected directly to the main shaft and the direction of movement of the vehicle will be changed.

In order to change the speed of the vehicle, the adjusting-lever 45 is moved in the opposite direction, or to the right, causing movement of the rocker-arm 43 and rack 38 in the opposite direction and moving the gear 28 out of mesh with the pinion 31, and at the same time pinion 31 is moved in the direction of the gear 32. The pinion 29 is now shifted by means of the lever 50 and moved into engagement with the gear-wheel 32, so that a train of reducing-gearing is formed, which includes the shaft 27, pinion 29, gear 32, shaft 30, pinion 31, and the main gear 37, and the speed of travel of the vehicle is reduced to the desired extent.

With a device of this character it is possible to quickly alter the speed or to reverse the direction of movement of the vehicle without rendering it necessary to actually stop the engines; but while clutching devices G have been shown as the means for connecting and disconnecting the gear-shafts from the engines it is to be understood that this may be dispensed with and in some cases the engines stopped by cutting off the power in the usual manner.

Having thus described the invention, what is claimed is—

1. In a speed-controlling and reversing mechanism, a driving and a driven shaft, a fixed gear on the driven shaft, a gear and pinion feathered on the driving-shaft and adjustable longitudinally of said shaft, a counter-shaft, a fixed gear and a longitudinally-adjustable pinion on the counter-shaft, a pair of parallel rack-bars connected, respectively, to the gear of the driving-shaft, and to the pinion on the counter-shaft, a gear connecting the two racks, and an adjusting means connected to one of the racks.

2. In speed-controlling mechanism, a pair of shafts arranged in parallel relation, intermeshing gears carried by the shafts, a pair of racks connected to the gears, and a gearing connection between the two racks whereby movement imparted to one rack in one direction will be transmitted to the opposite rack in the opposite direction.

3. The combination with a driving and a driven shaft, of a counter-shaft between the two, a fixed gear on the driven shaft, a gear and pinion carried by the driving-shaft and adjustable independently of each other lengthwise of said shaft, a fixed gear, and a longitudinally-adjustable pinion carried by the counter-shaft, a pair of racks connected, respectively, to the gear of the driving-shaft and the pinion of the counter-shaft, a gearing connection between the racks whereby movement imparted to one will be transferred to the other, and means for adjusting the pinion of the driving-shaft into and out of mesh with the fixed gear of the counter-shaft.

In testimony that I claim the foregoing as my own I have hereto affixed my signature in the presence of two witnesses.

FRED AUGUST GERLING.

Witnesses:
F. C. HOECKER,
W. T. BURNEY.